US012623696B2

(12) United States Patent
Fowler

(10) Patent No.: US 12,623,696 B2
(45) Date of Patent: May 12, 2026

(54) CONVOLUTE FOR A GANGWAY, BELLOWS, AND GANGWAY

(71) Applicant: Dellner Couplers AB, Falun (SE)

(72) Inventor: Jason Fowler, Derby (GB)

(73) Assignee: Dellner Couplers AB, Falun (SE)

( * ) Notice: Subject to any disclaimer, the term of this patent is extended or adjusted under 35 U.S.C. 154(b) by 875 days.

(21) Appl. No.: 17/845,787

(22) Filed: Jun. 21, 2022

(65) Prior Publication Data

US 2023/0001961 A1 Jan. 5, 2023

(30) Foreign Application Priority Data

Jun. 21, 2021 (EP) ..................................... 21180654

(51) Int. Cl.
B61D 17/22 (2006.01)
B60D 5/00 (2006.01)
(52) U.S. Cl.
CPC ............. B61D 17/22 (2013.01); B60D 5/003 (2013.01); B60D 5/006 (2013.01)
(58) Field of Classification Search
CPC .......... B61D 17/20; B61D 17/22; B60D 5/00; B60D 5/003; B60D 5/006
USPC ........................................ 105/8.1, 15, 17, 18
See application file for complete search history.

(56) References Cited

U.S. PATENT DOCUMENTS 1,891,964 A * 12/1932 Whitmore .............. B61D 17/22
105/15

FOREIGN PATENT DOCUMENTS

CN 203698285 U * 7/2014
EP 631890 A1 * 1/1995 ............. B60D 5/003
EP 1568520 A1 8/2005
EP 2810845 A1 12/2014

OTHER PUBLICATIONS

European Search Report for application 21180654.2, dated Dec. 3, 2021, 6 pages.

* cited by examiner

*Primary Examiner* — S. Joseph Morano
*Assistant Examiner* — Heaven R Buffington
(74) *Attorney, Agent, or Firm* — Howard IP Law Group, PC

(57) ABSTRACT

A convolute for a gangway, whereby the convolute extends from a first edge to a tip, and from the tip to a second edge, whereby the convolute has a bottom edge, whereby a gap filler is attached to the convolute in an area of the convolute that borders the bottom edge, whereby the gap filler has a flexible section that protrudes downwards from the bottom edge.

11 Claims, 7 Drawing Sheets

CONVOLUTE FOR A GANGWAY, BELLOWS, AND GANGWAY

FIELD OF THE INVENTION

The invention pertains to a convolute for a gangway. The invention also pertains to a bellows for a gangway. The invention also pertains to a gangway.

BACKGROUND

Gangways are known from everyday life for numerous applications. Multi-car vehicles, like trains or articulated buses often are designed with a gangway that is arranged between a first car and a second car of the multicar vehicle. Gangways are often designed to have bellows. The bellows typically is made up of a series of convolutes, the respective convolutes being arranged one next to the other to form the bellows.

Gangways often have a floor. In some designs of gangways, the convolute as a bottom edge that is arranged at a distance from a top surface of the floor or the top surface of a part of the floor.

SUMMARY

Given this background, a problem to be solved by the invention is to suggest a convolute for a gangway and a gangway that are either more aesthetically pleasing and/or safer than the gangways known from the prior art.

This problem is solved by one or more of the convolute, bellows, and gangway according to embodiments of the present disclosure. Preferred embodiments are described in the description following here after.

The invention is based on the basic idea to provide the individual convolute with a gap filler that is attached to the convolute in an area of the convolute that borders the bottom edge, whereby the gap filler has a flexible section that protrudes downwards from the bottom edge. The flexible section of the gap filler that protrudes downwards from the bottom edge can be used to at least partially, preferably completely cover a gap between the bottom edge of the convolute and a top surface of the floor or the top surface of a part of the floor. This allows the gangway to be more aesthetically pleasing, because the gap is less visible. This design also can be considered to be more safer than gangways that have a gap between the bottom edge of the convolute and a top surface of the floor or a top surface of a part of the floor, because the flexible section that protrudes downwards from the bottom edge reduces the chance of items being inserted into the gap between the bottom edge of the convolute and the top surface of the floor or the part of the floor respectively.

The inventive concept to attach the gap filler to the individual convolute provides the additional advantage that the gap filler can follow the movements of the convolute. Convolutes of bellows of gangways are compressed or expanded in certain operational conditions. For example, if a multicar vehicle that has a gangway with a bellows travels around a bend, the convolute on the inner side of the bend will be compressed while the convolute at the outer side of the curve will be expanded. Also, sideways movements will occur in driving conditions where the longitudinal axis of the one car of the multicar vehicle is slightly offset, but still parallel to the longitudinal axis of the other car. Movements into the vertical direction are also feasible and known to the skilled person. Because according to the invention the gap filler is attached to the individual convolute, the invention allows the gap filler to follow the individual movements of the individual convolute more closely. This will lead to an improved coverage of the gap between the bottom edge of the convolute in relation to the top surface of the floor or the part of the floor in comparison to designs where a gap filler is made as an individual element that does not follow the movements of the convolute.

The convolute according to the invention is suitable to be used as part of a gangway. The convolute extends from a first edge to a tip and from the tip to a second edge. The first edge typically for the majority, preferably for the overwhelming majority (more than 75%) and most preferably for its complete extent extends along a straight line. The second edge typically for the majority, preferably for the overwhelming majority (more than 75%) and most preferably for its complete extent extends along a straight line.

Typically, the first edge is suitable to be attached to the second edge of a neighboring convolute. The attachment between the edges of neighboring convolutes can be made by way of stitching, gluing, VELCRO® brand hook and loop type fastener, bolting, riveting, clamping and/or crimping, whereby embodiments are feasible, where only an individual way of attachment of the above-mentioned list of attachment methods is used and whereby embodiments are feasible, where combinations of the attachment methods are used to attach the first edge of one convolute to the second edge of a neighboring convolute.

The first edge and/or the second edge can be reinforced. For example, a bar or a lath can be attached to the area of the convolute bordering the first edge of the second edge respectively, which bar or lath extends along at least a part of the first edge or the second edge respectively. The bar or lath can be separately attached to the basic material of the convolute in the area of the first edge of the second edge respectively. The bar or the lath can also be arranged inside the basic material of the convolute, for example in embodiments where the basic material of the convolute in the area of the first edge has a pocket into which a bar or a lath is introduced. Embodiments are also feasible, where the basic material of the convolute is galvanized over a bar or a lath.

The convolute can be made from a single flexible material. This is often a sheet like material. In these embodiments, the basic material of the convolute extends from the first edge to the tip and back to the second edge. In alternative embodiments, the convolute is made up of two basic parts, whereby the first basic part extends from the first edge to the tip and the second basic part extends from the tip to the second edge, whereby the first basic part and the second basic part are connected to each other at the tip. At the tip the first basic part and the second basic part can be attached to each other by way of stitching, gluing, VELCRO® brand hook and loop type fastener, bolting, riveting, clamping and/or crimping.

The basic material of the convolute or the material from which the first basic part and the second basic part of the convolute are made of, typically is a flexible material, preferably a fabric material constructed of layers of rubber and fabric. In a preferred embodiment, the convolute is made from a flexible material.

The convolute of the invention as a bottom edge. The bottom edge preferably is arranged at an angle between 30° and 150°, preferably between 45° and 135°, preferably between 70° and 110°, preferably between 80° and 100°, preferably at 90° to the first edge and/or the second edge. Preferably the first edge for the majority of its extent, preferably for the overwhelming majority of its extent (more than 75°) and most preferably for its complete extent is arranged in a vertical plane. Preferably the second edge for the majority of its extent, preferably for the overwhelming majority of its extent (more than) 75° and most preferably for its complete extent is arranged in a vertical plane. In a preferred embodiment the convolute according to the invention can take up a shape in an operational condition, in which the first edge and the second edge for the majority of their respective extent, more preferably for the overwhelming majority (more than 75%) and most preferably for the complete respective extent are arranged in the same vertical plane. In a preferred embodiment, the bottom edge for the majority of its extent, preferably for the overwhelming majority (more than 75%) of its extent and preferably for its complete extent is arranged in a horizontal plane.

In a preferred embodiment the convolute according to the invention can take up a shape in an operational condition whereby the convolute is mirror symmetrical about a vertical plane that dissects the tip of the convolute.

In a preferred embodiment the lengths of the first edge and/or the length of the second edge is larger than the length of the bottom edge. Preferably the length of the first edge and/or the length of the second edge is double, preferably three-times, more preferably 4-times, more preferably 5-times the length of the bottom edge.

In the designs where the convolute is made up from one basic material that extends from the first edge over the tip to the second edge, the bottom edge preferably is the bottom edge of this one-piece basic material. In embodiments where the convolute is made up of a first basic part that extends from the first edge to the tip and a second basic part that extends from the tip to the second edge, the bottom edge preferably has two parts, namely a first bottom edge part that is the bottom edge of the first basic part that extends from the first edge to the tip and a second bottom edge part that is the bottom edge of the second basic part that extends from the tip to the second end.

In a preferred embodiment the convolute according to the invention is a convolute of an inward facing bellows. Gangways can have inward facing bellows that are arranged to delimit that part of the gangway through which the passenger is to pass. In those inward facing gangways the first edge and the second edge are arranged further outwards than the tip. Alternative embodiments of bellows for gangways are known, which are outward facing. In these embodiments the first edge and the second edge would be placed more inwards relative to the tip.

In a preferred embodiment the angle between a line, preferably a line drawn in a horizontal plane that crosses the first edge and the tip to a line, which preferably is arranged in the same horizontal plane as the first line, which crosses the tip and the second edge at least for one condition of use of the convolute is less than 180°, preferably less than 135°, preferably less than 90°.

The convolute according to the invention can be an individual convolute that has a bottom edge and that terminates in a top edge. The convolute according to the invention can, however, also be part of a larger structure. The convolute according to the invention can be a side convolute and has a top end, whereby the top end is attached to a top convolute, which top convolute extends at an angle away from the side convolute according to the invention. In a preferred embodiment, the top convolute can be attached at its opposite end to a further side convolute, preferably to a further side convolute according to the invention. Hence the convolute according to the invention can be part of a larger structure that is made up of a first (side) convolute according to the invention, a top convolute and a second (side) convolute according to the invention. Such a larger structure can have the shape of an inverted U or can be considered to have a horse shoe shape.

In a preferred embodiment the convolute extends in an arc-shaped manner from the first edge to the second edge, the tip of the convolute being at the tip of the arc. This design preferably is used for those embodiments where the convolute is made up from one basic material that extends from the first edge over the tip to the second edge. The convolute could also have a V-shaped cross section, for example for those designs where the convolute is made up from a first basic part that extends from the first edge to the tip and a second basic part that extends from the tip to the second edge, whereby the first basic part and the second basic part are connected to each other at the tip.

According to the invention a gap filler is attached to the convolute in an area of the convolute that borders the bottom edge. The gap filler has a flexible section that protrudes downwards from the bottom edge.

In a preferred embodiment, the gap filler has a width, whereby the width is understood to be the extent of the gap filler in the direction perpendicular to the direction into which the flexible section protrudes downwards from the bottom edge. In a preferred embodiment, the width of the gap filler is equal to or smaller than the length of the bottom edge. In a preferred embodiment, the width of the gap filler is larger than 20%, preferably larger than 50% of the length of the bottom edge. Given that the gap filler preferably follows the shape of the convolute and preferably follows the shape of the bottom edge, the width direction in the above given definition is not a linear direction once the gap filler is attached to the convolute. If the gap filler is made from a sheet material and is a flat piece before it is attached to the convolute, the width direction is a linear direction on this flat piece.

In a preferred embodiment, the gap filler has a first edge. In a preferred embodiment, the gap filler extends from a first edge to a tip. In a preferred embodiment, the gap filler has a second edge. In a preferred embodiment, the gap filler extends from the tip to the second edge. In a preferred embodiment, the first edge of the gap filler is arranged closer to the first edge of the convolute than to the tip of the convolute. Preferably, the first edge of the gap filler is arranged at the first edge of the convolute, more preferably attached to the first edge of the convolute. In a preferred embodiment, the second edge of the gap filler is arranged closer to the second edge of the convolute than to the tip of the convolute. Preferably, the second edge of the gap filler is arranged at the second edge of the convolute, more preferably attached to the second edge of the convolute. In a preferred embodiment, the tip of the gap filler is arranged closer to the tip of the convolute than to the first edge of the convolute and closer to the tip of the convolute than the second edge of the convolute. In a preferred embodiment, the tip of the gap filler is arranged at the tip of the convolute.

In a preferred embodiment, the gap filler is made from one basic piece of material, preferably from a sheet like material.

In a preferred embodiment, the gap filler is made of a flexible material, preferably the same material that the first basic part and the second basic part of the convolute are made of, preferably a fabric material constructed of layers of rubber and fabric. The thickness of the material used for the gap filler might be the same or less than the thickness of the material used for the first basic part and the second basic part.

The gap filler has a flexible section. In a preferred embodiment, the stiffness of the gap filler in the flexible section is smaller than the stiffness of the gap filler in a different section of the gap filler. In a preferred embodiment, the reduced stiffness of the gap filler in the flexible section can be provided by changes in the material or the geometry of the material, from which the gap filler is made of in the flexible section. For example, the thickness of the material from which the gap filler is made of can be reduced in the flexible section compared to other sections of the gap filler.

In a preferred embodiment the reduced stiffness of the flexible section of the gap filler is provided by disruptions in the material from which the gap filler is made of in the flexible section. In a preferred embodiment, holes and/or slits are arranged in the flexible section. In a preferred embodiment, a series of slits is arranged in the flexible section. In a preferred embodiment the individual slit of the series of slits extends from the end of the gap filler that is furthest away from the bottom edge towards the bottom edge. In a preferred embodiment, the slits arranged in the flexible section of the gap filler are arranged in parallel to each other. In a preferred embodiment, the slits arranged in the flexible section of the gap filler extend vertically. In a preferred embodiment, the individual slit terminates in a hole arranged in the gap filler. Providing these holes, for example round holes reduces the risk of the slits tearing further into the material of the gap filler. In addition to or as an alternative, means can we provided that stop a slit in the flexible section of the gap filler to tear further into the material during the use of the convolute. For example, a stitching can be arranged at the end of a slit that is arranged in the flexible section of the gap filler or a crimping can be arranged at the end of the slit.

In a preferred embodiment, the flexible section comprises a plurality of fringes that extend in a downward direction. The fringes can be made by inserting slits into the flexible section of the gap filler.

In a preferred embodiment, the flexible section of the gap filler has a first section that is arranged closer to the first edge of the gap filler than to the tip of the gap filler. In a preferred embodiment, this first section of the flexible section does not have any fringes and/or does not have any slits introduced into the flexible section in this first section. In a preferred embodiment, the flexible section of the gap filler has a second section that is arranged closer to the second edge of the gap filler than to the tip of the gap filler. In a preferred embodiment, this second section of the flexible section does not have any fringes and/or does not have any slits introduced into the flexible section in this second section. In a preferred embodiment, the plurality of fringes are arranged in the flexible section of the gap between the first section of the flexible section and the second section of the flexible section.

In a preferred embodiment, the number of fringes provided is more than 3, preferably more than 5, preferably more than 10. In a preferred embodiment, the number of fringes provided is less than 50, preferably less than 40, probably less than 30 preferably less than 20.

According to the invention, the gap filler is attached to the convolute in an area of the convolute that borders the bottom edge. In a preferred embodiment, the area of the of the convolute that borders the bottom edge is considered to be that area that extends from the bottom edge to the middle of the convolute, preferably that area that extends from the bottom edge half way to the middle of the convolute, preferably that area that extends from the bottom edge one third of the way to the middle of the convolute, preferably that area that extends from the bottom edge one quarter of the way to the middle of the convolute.

In a preferred embodiment, the gap filler is attached to the convolute in a releasable manner. Embodiments are feasible, where the gap filler is fixedly attached to the convolute, for example by way of stitching by way or gluing the gap filler to the area of the convolute that borders the bottom edge or by bolting or by riveting or by clamping or by crimping. In a preferred embodiment, the gap filler is attached to the convolute in a releasable manner. It is expected that wear will occur at the bottom edge of the gap filler. This wear may reduce the amount by which the gap filler protrudes downwards from the bottom edge and might increase the free gap that remains between the top surface of the floor or the top surface of a part of the floor of the gangway and the end of the gap filler. Given the long lifetime of gangways, it might be feasible to exchange the gap fillers as a means of maintenance of the convolute. For this reason, it is preferred, if the gap filler is attached to the convolute in a releasable manner. The gap filler can be attached to the convolute by way of a VELCRO® brand hook and loop type fastener mechanism. The gap filler can be attached to the convolute by way of at least one push button, preferably by way of several push buttons, preferably at least by way of 3 push buttons. The gap filler can be attached to the convolute by means of screws or rivets.

In a preferred embodiment, the gap filler has one single point of attachment provided for the attachment to the convolute. For example, if the means of attaching the gap filler with the convolutes require a hole to be placed in the gap filler, in a preferred embodiment, the gap filler only has one hole intended to be used for the connection of the gap filler to the convolute. If the gap filler has several points of attachment, for example has 3 points of attachment, for example one point of attachment closest to the first edge of the gap filler, one point of attachment close to the tip of the gap filler and one point of attachment closest to the second edge of the gap filler, preferably in these points of attachments only one point of attachment is realized, for example only one hole is realized per point of attachment. This design can be used to connect the gap filler always in the same manner to the convolute. In an alternative embodiment, in each area of attachment the gap filler has several points of attachment, for example several holes placed one above the other. This design would allow to choose different ways of attaching the gap filler to the convolute, especially changing the amount by which the flexible section protrudes downwards over the bottom edge. If a series of holes is provided, attaching the gap filler to the convolute by way of the top hole will lead to the flexible section to protrude downwards from the bottom edge by a first, large amount, whereby using a hole in the gap filler that is arranged further downwards would mean that the flexible section protrudes downwards from the bottom edge by a second, smaller amount. Such a design could be used to adopt by way of attachment of the gap filler to the convolute to different sizes of gaps between the bottom edge of the convolute and the top surface of the floor or the top surface of the part of the floor.

In a preferred embodiment, the gap filler has an area of attachment provided for the attachment to the convolute, this area forms part of a VELCRO® brand hook and loop type-connection. In a preferred embodiment the area of attachment stretches over more than 30%, preferably more than 50%, preferably over more than 75% of the width of the gap filler.

In a preferred embodiment, the convolute has a crossbar that is attached to the convolute, whereby the gap filler is attached to the crossbar of the convolute. In a preferred embodiment, the gap filler is only attached to the crossbar of the convolute and not attached to any other part of the convolute. The gap filler may be attached to the crossbar by a VELCRO® brand hook and loop type fastener connection.

In a preferred embodiment, the crossbar has a first end that is attached to that part of the convolute that extends from the first edge to the tip and/or is attached to the first edge. In a preferred embodiment, the crossbar has a second end and is attached to that part of the convolute that extends from the tip to the second edge and/or is attached to the second edge. In a preferred embodiment the first end of the crossbar is attached to that part of the convolute that extends from the first edge to the tip and within this part is attached to that part at an area that is closer to the first edge than to the tip. In a preferred embodiment the second end of the crossbar is attached to that part of the convolute that extends from the tip to the second edge and within this part is attached to that part at an area that is closer to the second edge than to the tip.

In a preferred embodiment, the crossbar is made from a flexible material. In a preferred embodiment, the crossbar is made from a flexible material, preferably the same material that the first basic part and the second basic part of the convolute are made of, preferably a fabric material constructed of layers of rubber and fabric. The thickness of the material used for the gap filler might be the same or less than the thickness of the material used for the first basic part and the second basic part. In a preferred embodiment, the crossbar is reinforced by stiffer material, for example a metal plate attached to the flexible material or sewn into the flexible material. The crossbar can be additionally used to act as support and/or to add stiffness to the lower section of the convolute. Increasing the stiffness is helpful in this area as users' feet would often kick and lean against this area. The metal plate can also be used to support the back of a turn buckle that forms part of a rivet. This adds rigidity to the buckle to allow it be turned and connect to the adjustable section of the adjustable part.

In a preferred embodiment the gap filler has an attachment end, whereby the attachment end is attached to the crossbar, whereby the gap filler extends upwards from the attachment end and passes around the top of the crossbar and extends downwards after having passed around the top of the crossbar. In a preferred embodiment, the attachment of the crossbar to the convolute is such that a space is created between the crossbar and that part of the convolute that is in the area of the tip. In a preferred embodiment, the gap filler passes through this space after having been passed around the top of the crossbar.

The bellows according to the invention has a series of convolutes arranged next to each other, whereby at least one of the convolutes is a convolute according to the invention. In a preferred embodiment, the bellows has more than 3, probably more than 4, preferably more than 5 convolutes. In a preferred embodiment, the majority of the convolutes of the bellows, more preferably the overwhelming majority (more than 75%) of the convolutes of the bellows and even more preferred all convolutes of the bellows each have a first end and a second end and a tip, whereby the individual convolute extends from the first edge to the tip and from the tip to the second edge. In a preferred embodiment, the majority of the convolutes of the bellows, more preferably the overwhelming majority (more than 75%) of the convolutes of the bellows and more preferably all convolutes of the bellows have a bottom edge. In a preferred embodiment, for the majority, preferably for the overwhelming majority (more than 75%) and even more preferred for all convolutes of the bellows their respective bottom edges are arranged in the same plane. In a preferred embodiment the majority of the convolutes, preferably the overwhelming majority (more than 75%) and even more preferred all the convolutes of the bellows are convolutes according to the invention and hence each have a gap filler.

In a preferred embodiment, the bellows has at least a first convolute and a second convolute which are each convolutes according to the invention, whereby the gap filler of the first convolute protrudes downwards from the bottom edge of the first convolute by a first amount and the gap filler of the second convolute protrudes downwards from the bottom edge of the second convolute by a second amount that is different from the first amount. In a preferred embodiment, the bottom edge of the first convolute and the bottom edge of the second convolute are arranged in the same plane, preferably in the same horizontal plane. Having the gap filler of the individual convolute extend downwards from the bottom edge at a different amount provides the advantage that invention can be adapted to those designs of gangways where the floor does not have one single top surface that is arranged in one horizontal plane, but where the floor is made up of several parts, which in a preferred embodiment are arranged overlapping to each other, which leads to the floor having different parts with top surfaces that are arranged in the different horizontal planes. Having the gap filler of the individual convolute extend downwards over the bottom edge differently for the individual convolute allows to adapt to such floors. For those parts of the floor that have a top surface that is arranged closer to the respective bottom edge of the convolute that is arranged above it, the flexible section of the gap filler to be designed to extend over the bottom edge of the respective convolute by a lesser amount than the flexible section of a gap filler that is attached to a convolute that is arranged above the top surface of a part of the floor that is arranged further away from the bottom edge.

In a preferred embodiment, the flexible section to the gap filler that is attached to the first convolute has a smaller extent downwards than the flexible section of the gap filler of the second convolute. In a preferred embodiment that part of the gap filler that is attached to the first convolute and which part is above the bottom edge of this first convolute is of the same design as that part of the gap filler that is attached to the second convolute that is arranged above the bottom edge of the second convolute. The individual gap filler is attached to the individual convolutes and hence can be of the same design as regards those parts of the gap filler which are arranged above the bottom edge and that are predominantly used to attach the individual gap filler to the convolute. If it is chosen to design the gap fillers differently, in a preferred embodiment the difference in the design of the individual gap fillers is only in the flexible section and especially only in the downward extent of the flexible section while the individual gap fillers are of the same design for their respective other parts.

The gangway according to the invention has a bellows according to the invention and has a floor. In a preferred embodiment, the floor has a top surface that is arranged at a distance to the bottom edge of at least one convolute of the bellows, whereby that convolute is arranged above the floor. In a preferred embodiment, the floor is made up of several parts, whereby one part of the floor has a top surface that is arranged at a distance of the bottom edge of at least one convolute of the bellows, which convolute is arranged above the top surface of that part of the floor. In a preferred embodiment, the floor is made up of several parts, whereby one part is arranged above another part of the floor, prefer- ably being supported by another part of the floor. In a preferred embodiment, at least two parts of the floor are designed as treadplates. In a preferred embodiment, at least two parts of the floor are made so that they can move relative to each other.

In a preferred embodiment the gangway is used in a multicar vehicle, preferably in a train or a tram.

BRIEF DESCRIPTION OF DRAWINGS

Below the invention will be described in more detail with reference to the figures.

Figures only show embodiments of the invention. In the figures

DETAILED DESCRIPTION

Figure 1:
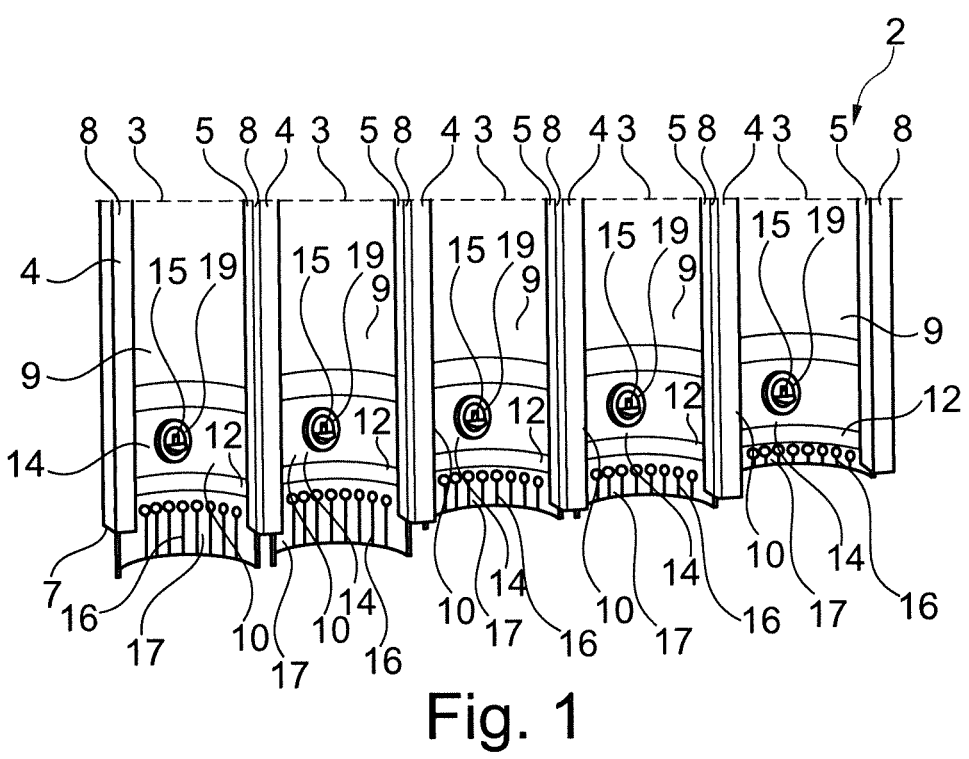
FIG. 1 shows a schematic perspective view from the outside of a bellows onto a part of the bellows.

The gangway 1 according to the invention has a bellows 2. The bellows 2 is made up of a series of convolutes 3. Each convolute 3 has a first edge 4 and a second edge 5 and a tip 6, whereby each convolute 3 extends from the first edge 4 to the tip 6 and from the tip 6 to a second edge 5. Each convolute 3 has a bottom edge 7.

In the design shown in FIG. 1, 2, 3, 4, 5, 9 each convolute 3 is made from on single basic material, which basic material is a sheet like material, namely fabric material constructed of layers of rubber and fabric. The respective convolute 3 extends in an arc-shaped manner from the first edge 4 to the second edge 5, the tip 6 being the tip of the arc.

Figure 4:
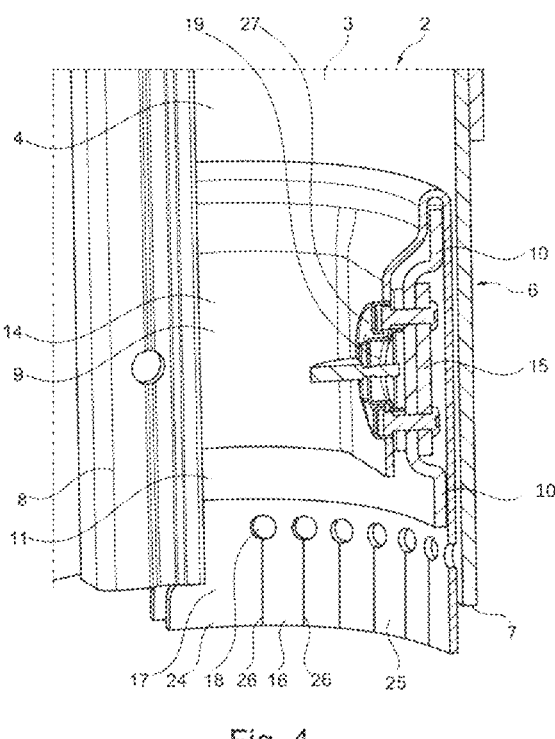
FIG. 4 shows a schematic, perspective view onto the sectional view of FIG. 3.

As can best be seen in FIGS. 1 and 4, each convolute 3 is attached to the neighboring convolute 3. The first edge 4 of one convolute 3 is attached to the second edge 5 of the neighboring convolute 3. In the embodiments shown in FIGS. 1 and 4, the attachment is provided by a u-shaped bar 8 that crimps the first edge 4 of the one convolute 3 and the second edge 5 of the neighboring convolute 3 together.

Each convolute 3 is provided with a gap filler 9. The respective gap filler 9 is attached to the convolute 3 in an area of the convolute 3 that borders the bottom edge 7. The respective gap filler 9 has a flexible section 17 that protrudes downwards from the bottom edge 7.

The respective convolute 3 has a crossbar 10. The cross- bar 10 is made from a flexible, sheet material, namely a fabric material constructed of layers of rubber and fabric. The crossbar 10 has a first end 11 that is attached to that part of the convolute that extends from the first edge to the tip.

The crossbar 10 has a second end 12 that is attached to that part of the convolute that extends from the tip to the second edge.

Figure 7:
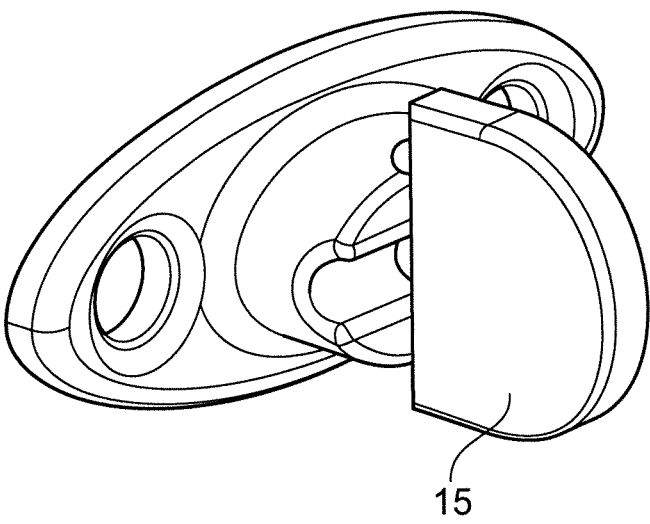
FIG. 7 shows a perspective view onto a connection element

The gap filler 9 is releasable attached to the crossbar 10. The gap filler 9 has an attachment end 14, whereby the attachment end 14 is attached to the crossbar 10 by way of a connection piece 15 (see FIG. 7). The gap filler 9 extends upwards from the attachment end 14 and passes around the top of the crossbar 10 and extends downwards after having passed around the top of the crossbar 10.

The flexible section 17 of the respective gap filler 9 comprises a plurality of fringes 16 that extend in a down- ward direction. The fringes 16 are provided by way of slits 26 cut into the flexible section 17. The slits 26 terminate in holes 18 provided in the gap filler 9.

The gap filler 9 in the embodiment shown in FIGS. 1 to 6 has one attachment hole 19. This attachment hole 19 can be a reinforced hole, for example can be reinforced by way of metal rings 27 arranged on either side of the gap filler material.

Figure 8:
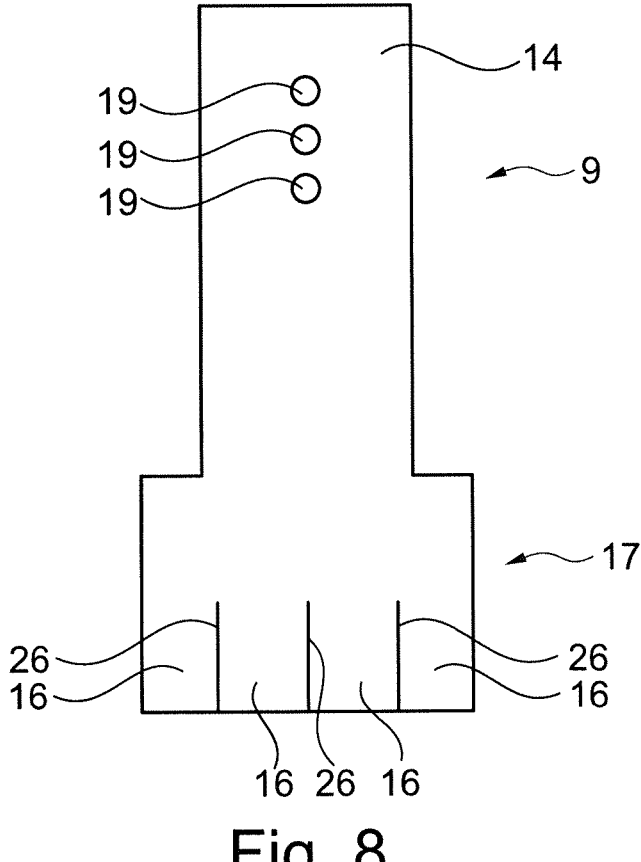
FIG. 8 shows a front view onto a gap filler

In the design shown in FIG. 8, the gap filler 9 has several attachment holes 19 arranged one above the other. This design can be used to adapt the amount by which the flexible section 17 extends downwards over the bottom edge 7.

Figure 2:
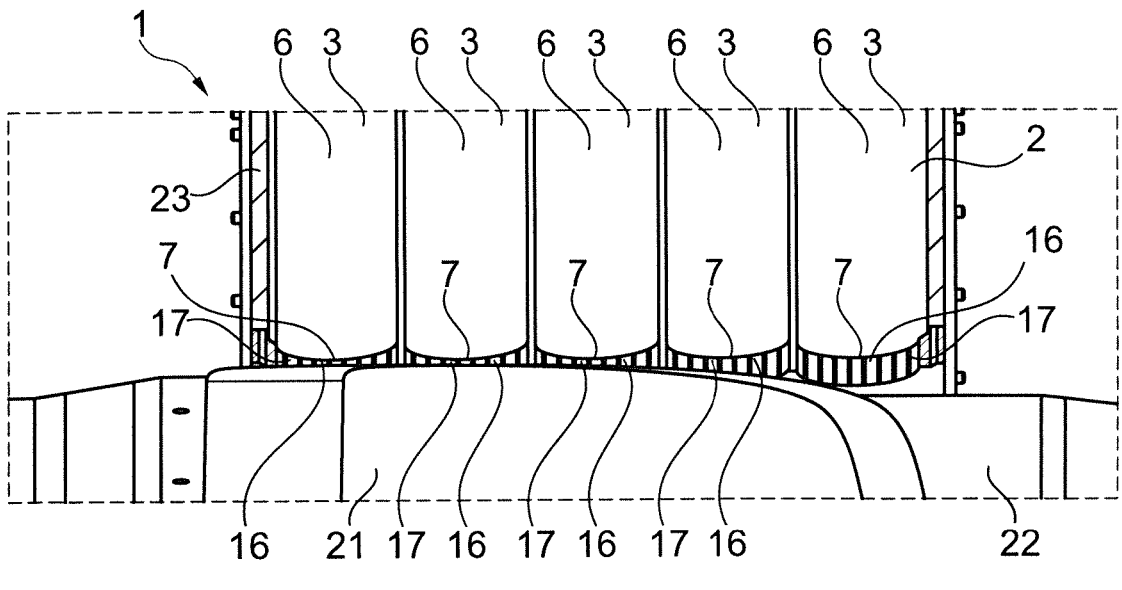
FIG. 2 shows a schematic perspective view from inside a gangway onto a part of the floor and a part of the bellows of the gangway.

In the design shown in FIGS. 1 to 6, the amount by which the flexible section 17 extends over the bottom edge 7 is adapted by changing the extend of the flexible section 17. As can best be seen from FIGS. 1 and 2, the extend of the flexible section 17 for the two convolutes 3 to the left in FIG. 1 and to the right in FIG. 2 is longer than the extend of the flexible section 17 of the remaining convolutes 3. As can be seen from FIG. 2, the two convolutes 3 that have the larger flexible section 17 are arranged in a part of the gangway 1, where due to the particular design of the floor 20 of the gangway, the gap between the bottom edge 7 of the respec- tive convolute 3 is larger for those two convolutes 3 than for the remaining convolutes 3. As can best be seen from FIGS. 2 and 5, the floor 20 of the gangway comprises a first part 21 and a second part 22. The first part 21 overlaps with the second part 22, whereby the first part 21 is arranged above the second part 22. The first part 21 has a top surface that is arranged from the bottom edges 7 of the convolutes 3 arranged above this first part 21 at a first, smaller distance, while the second part 22 has a top surface that is arranged from the bottom edges 7 of the two convolutes 3 arranged above this second part 22 at a second, larger distance.

Figure 5:
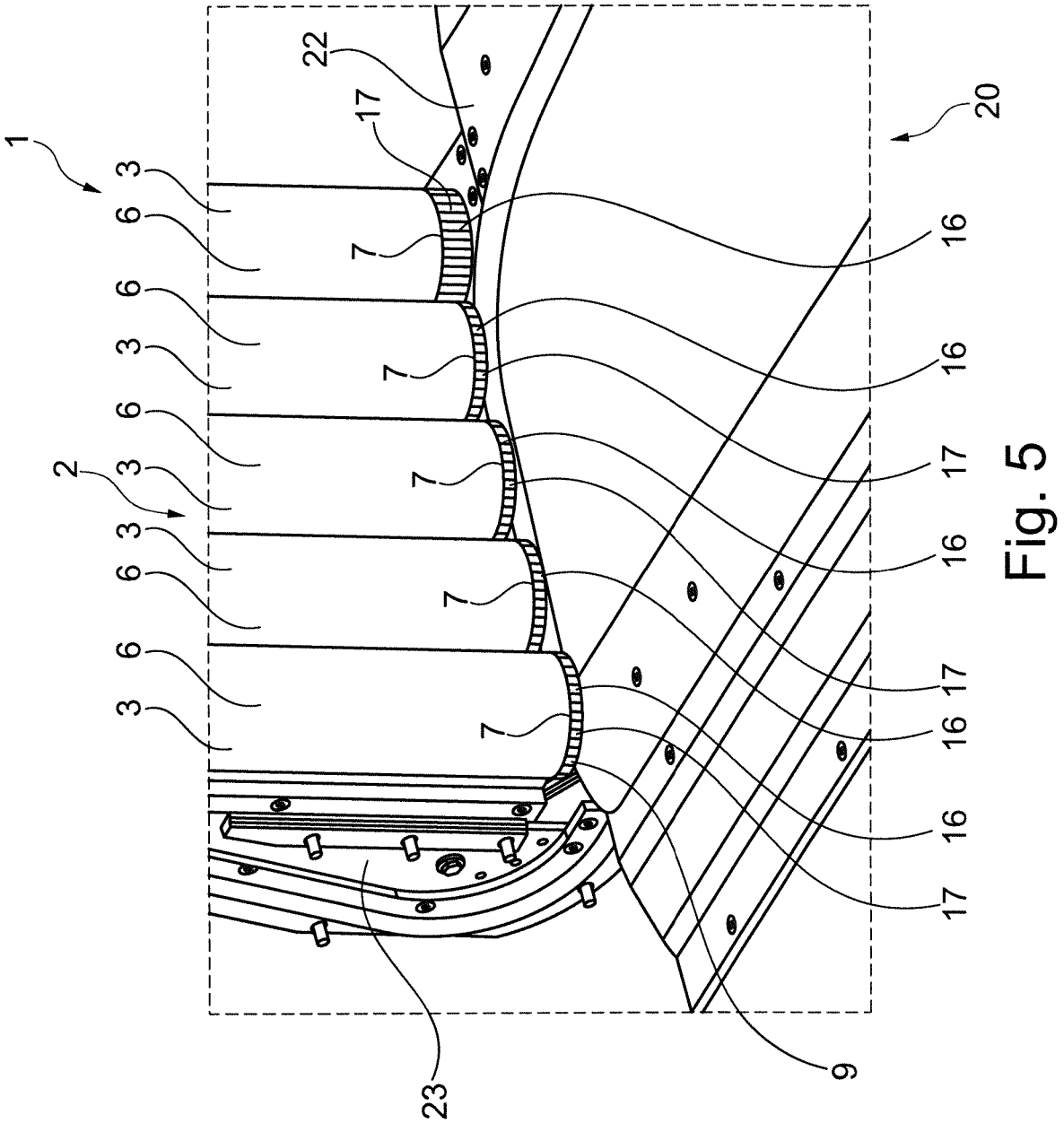
FIG. 5 shows a schematic perspective view from inside a gangway onto a part of the floor and a part of the bellows of the gangway.
Figure 6:
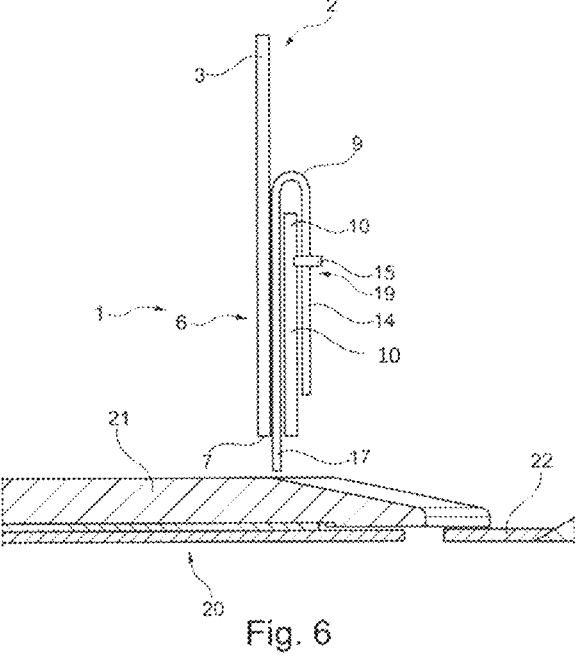
FIG. 6 shows a schematic side view onto the tip region of a convolute and a floor arranged below the convolute

FIG. 5 shows that the gangway 1 can have a vehicle mounting plate 23 that can be used to attach the gangway 1 to a car of a multi-car vehicle.

Figure 3:
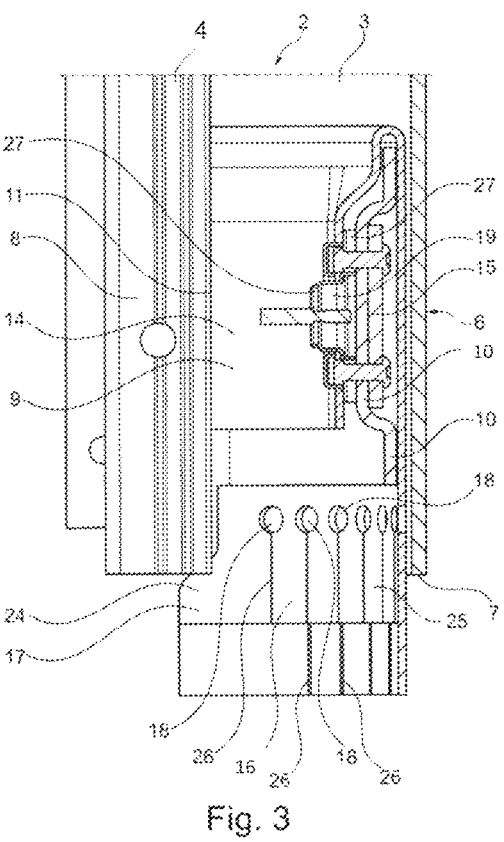
FIG. 3 shows a schematic sectional view onto a convo- lute.

As can be best seen from FIGS. 3 and 4, the flexible section 17 has a first part 24 that borders the first end 11 of the gap filler 9 and has a second part that borders the second end 12 of the gap filler 9, whereby the first part 24 and the second part do not have fringes and whereby the flexible section 17 has a third part 25 in which the fringes 16 are arranged.

Figure 9:
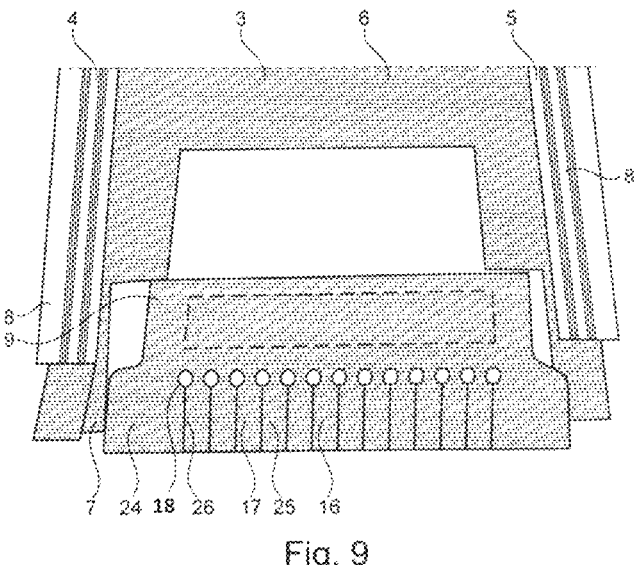
FIG. 9 shows a schematic view from inside a gangway onto a convolute of a gangway that is positioned in a flattened out manner.

In the embodiment shown in FIG. 9, the convolute 3 is provided with a gap filler 9. FIG. 9 shows the convolute 3 in a flattened out position. The gap filler 9 is attached to the convolute 3 in an area of the convolute 3 that borders the bottom edge 7. The gap filler 9 has a flexible section 17 that protrudes downwards from the bottom edge 7. The gap filler 9 is attached in a releasable manner to the convolute by way of a VELCRO® brand hook and loop type fastener connec- tion. The stitching shown on the gap filler 9 is the stitching used to attach the hook and loop type fastener-part to the gap filler 9. FIG. 9 shows that the hook and loop type fastenercounter-part on the convolute is larger than the hook and loop type fastener-part on the gap filler 9. This allows the gap filler 9 to be connected to the convolute 3 at different heights hence influencing the amount by which the flexible section 17 protrudes over the bottom edge 7.

The invention claimed is:

1. A convolute for a gangway, the convolute extending from a first edge to a tip, and from the tip to a second edge, the convolute having a bottom edge, and wherein a gap filler is attached to the convolute in an area of the convolute that borders the bottom edge, the gap filler having a flexible section that protrudes downwards from the bottom edge;

wherein the flexible section comprises a plurality of slits and a plurality of holes, wherein each of the slits is configured to terminate in each of the holes.

2. The convolute according to claim 1, wherein the convolute extends in an arc-shaped manner from the first edge to the second edge, the tip being the tip of the arc.

3. The convolute according to claim 1, wherein the convolute is made from a flexible material.

4. The convolute according to claim 1, wherein the gap filler is attached to the convolute in a releasable manner.

5. The convolute according to claim 1, wherein the gap filler is attached to the convolute by a Velcro hook and loop type connection.

6. The convolute according to claim 1, wherein the flexible section comprises a plurality of fringes that extend in a downward direction.

7. The convolute according to claim 1, further comprising a crossbar, the crossbar comprising:

a first end attached to a part of the convolute that extends from the first edge to the tip, or is attached to the first edge; and a second end that is attached to a second part of the convolute that extends from the tip to the second edge, or is attached to the second edge;

wherein the gap filler is attached to the crossbar.

8. The convolute according to claim 7, wherein the gap filler has an attachment end, wherein the attachment end is attached to the crossbar, and wherein the gap filler extends upwards from the attachment end and passes around a top of the crossbar and extends downwards after having passed around the top of the crossbar.

9. A bellows for a gangway, the bellows having a series of convolutes arranged next to one another, wherein at least one of the convolutes extends from a first edge to a tip, and from the tip to a second edge, wherein the convolute has a bottom edge, and wherein a gap filler is attached to the convolute in an area of the convolute that borders the bottom edge, and wherein the gap filler has a flexible section that protrudes downwards from the bottom edge;

wherein the flexible section comprises a plurality of slits and a plurality of holes, wherein each of the slits is configured to terminate in each of the holes.

10. The bellows according to claim 9, wherein at least a first convolute and a second convolute of the series of convolutes of the gangway extend from a first edge to a tip, and from the tip to a second edge, each of said at least first and second convolute having a bottom edge, and wherein a gap filler is attached to each of said at least first and second convolute in an area of the at least first and second convolute that borders the bottom edge, and wherein the gap filler has a flexible section that protrudes downwards from the bottom edge;

the gap filler of the first convolute protruding downwards from the bottom edge of the first convolute by a first amount; and the gap filler of the second convolute protruding downwards from the bottom edge of the second convolute by a second amount that is different from the first amount.

11. A gangway comprising:

a bellows; and a floor;

wherein the bellows comprises a series of convolutes arranged next to one another, at least one of the convolutes extending from a first edge to a tip, and from the tip to a second edge, wherein the at least one convolute has a bottom edge, and wherein a gap filler is attached to the at least one convolute in an area of the convolute that borders the bottom edge, and wherein the gap filler has a flexible section that protrudes downwards from the bottom edge; wherein the flexible section comprises a plurality of slits and a plurality of holes, wherein each of the slits is configured to terminate in each of the holes; and wherein at least part of the floor of the gangway has a top surface arranged at a distance from the bottom edge of a convolute that is arranged above at least that part of the floor.

* * * * *